(12) United States Patent
Wang et al.

(10) Patent No.: US 8,436,506 B2
(45) Date of Patent: May 7, 2013

(54) ELECTRIC MOTOR ASSEMBLIES AND SYSTEMS AND METHODS ASSOCIATED WITH JOINING WIRES OF ELECTRIC MOTOR ASSEMBLIES

(75) Inventors: Pei-Chung Wang, Shanghai (CN); John S. Agapiou, Rochester Hills, MI (US); John Patrick Spicer, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 12/759,358

(22) Filed: Apr. 13, 2010

(65) Prior Publication Data

US 2011/0248585 A1    Oct. 13, 2011

(51) Int. Cl.
*H02K 3/04* (2006.01)
*H02K 3/32* (2006.01)
*H02K 3/50* (2006.01)

(52) U.S. Cl.
USPC ........... 310/260; 310/179; 310/201; 310/206; 310/208; 228/115; 228/136; 228/180.5

(58) Field of Classification Search .......... 310/179, 310/201, 206, 208; *H02K 3/04, 3/32, 3/50*
See application file for complete search history.

(56) References Cited

U.S. PATENT DOCUMENTS

| | | | |
|---|---|---|---|
| 1,416,256 A | 5/1922 | Borger | |
| 2,407,935 A * | 9/1946 | Perfetti et al. | 310/201 |
| 3,192,423 A | 6/1965 | Pearson | |
| 3,675,058 A | 7/1972 | Beddows et al. | |
| 4,865,244 A * | 9/1989 | Morinaga | 228/56.3 |
| 5,504,275 A * | 4/1996 | Scramoncin | 174/84 C |
| 5,729,068 A * | 3/1998 | Gasparini et al. | 310/179 |
| 6,208,058 B1 * | 3/2001 | Taji et al. | 310/201 |
| 6,448,681 B1 | 9/2002 | Matsunaga et al. | |
| 6,943,466 B2 * | 9/2005 | Oohashi | 310/45 |
| 7,327,057 B2 | 2/2008 | Ito et al. | |
| 7,564,159 B2 | 7/2009 | Ooiwa | |
| 2002/0046875 A1 * | 4/2002 | Baumann et al. | 174/137 R |
| 2003/0207608 A1 * | 11/2003 | Weiss | 439/394 |
| 2003/0214190 A1 | 11/2003 | Congdon et al. | |
| 2006/0032895 A1 * | 2/2006 | Durand et al. | 228/234.1 |
| 2006/0232157 A1 * | 10/2006 | Ooiwa | 310/201 |
| 2009/0100565 A1 | 4/2009 | Berger et al. | |
| 2009/0295252 A1 | 12/2009 | Kowalski et al. | |

* cited by examiner

*Primary Examiner* — Tran N. Nguyen
*Assistant Examiner* — Terrance Kenerly
(74) *Attorney, Agent, or Firm* — Parks IP Law LLC; Mickki D. Murray

(57) ABSTRACT

A stator for an electric motor includes a stator coil including a wire pair with respective ends that are joined with a ring. The ring is positioned around the wire pair and joined to the wire pair by a metal joining process.

19 Claims, 4 Drawing Sheets

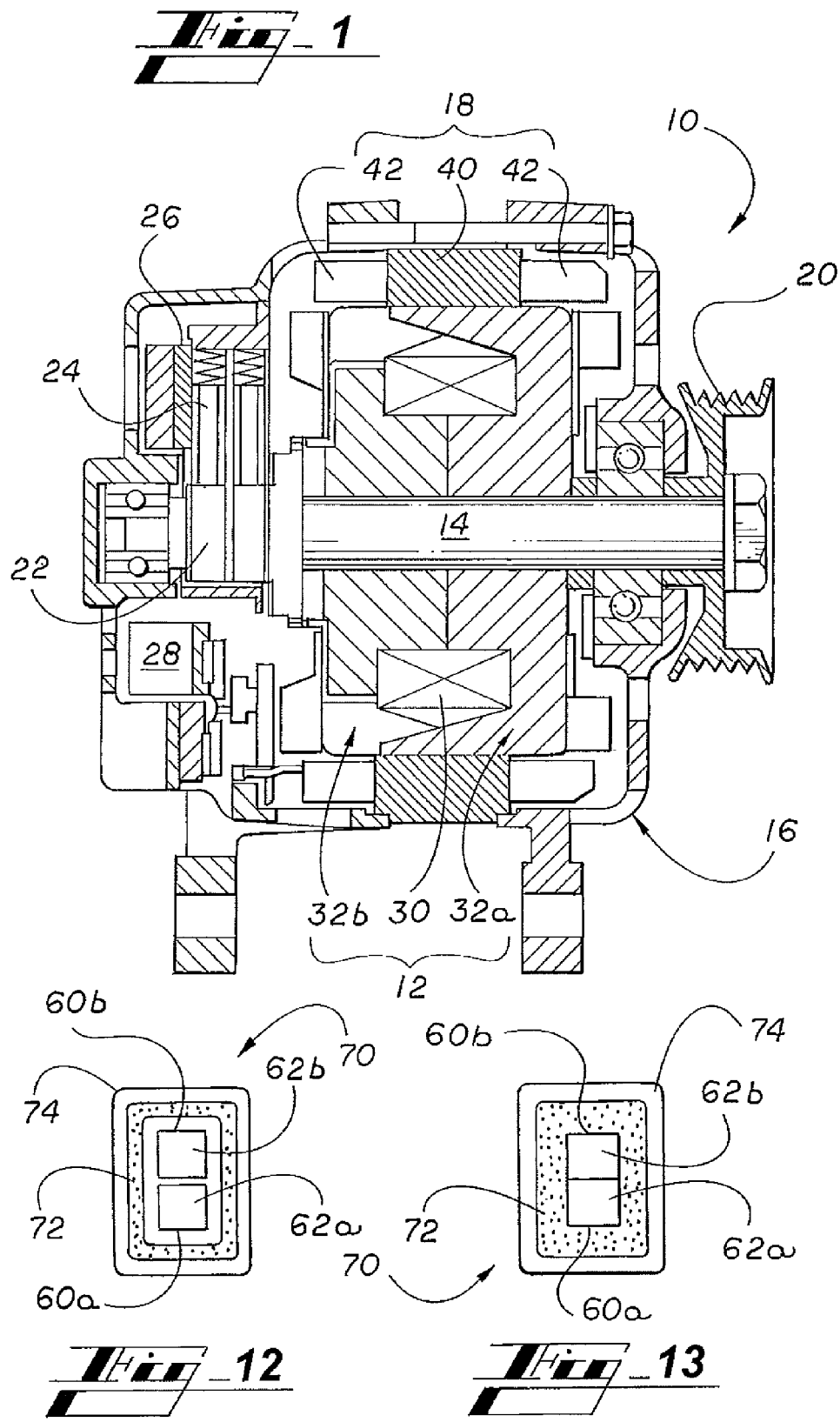

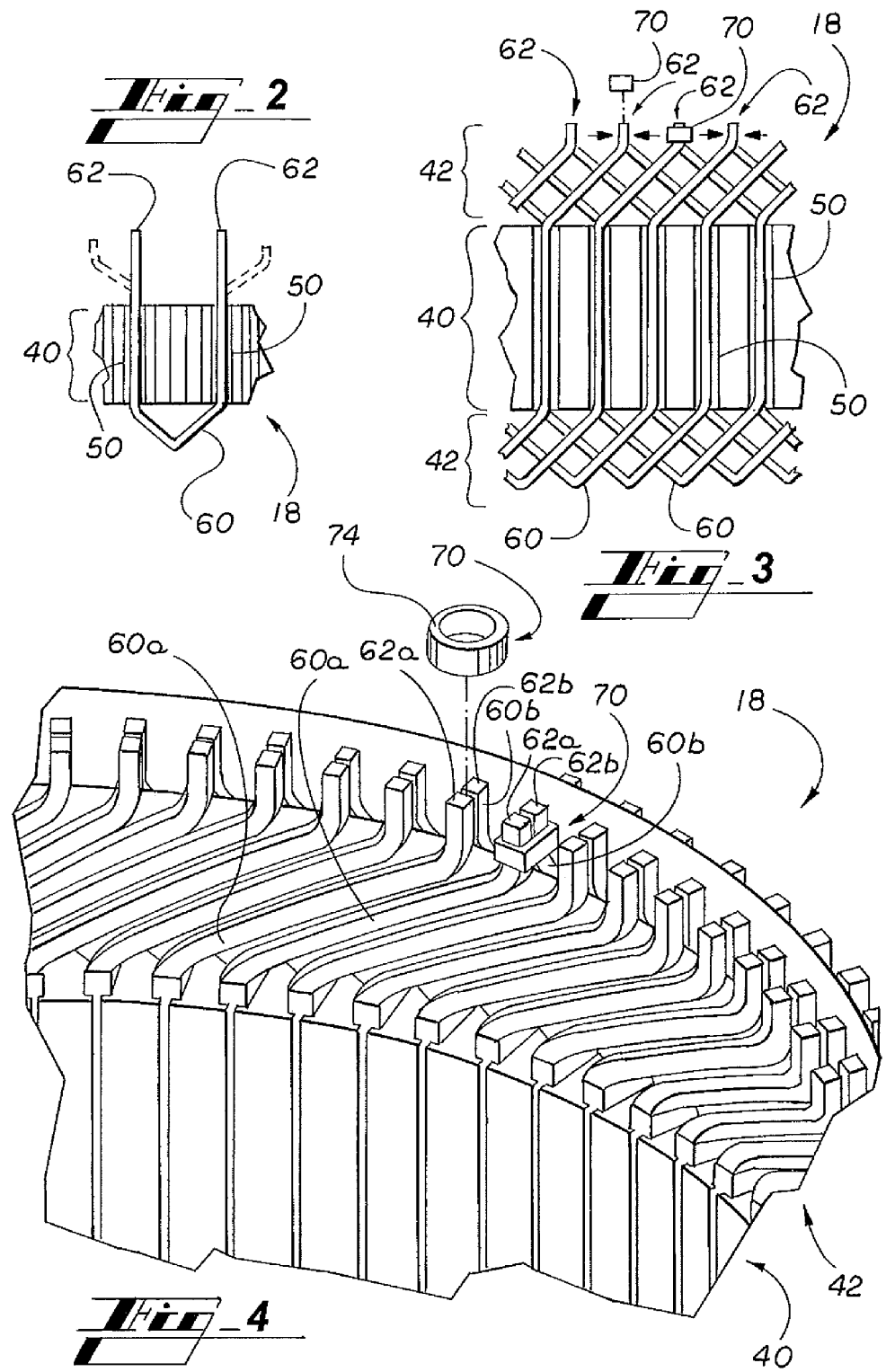

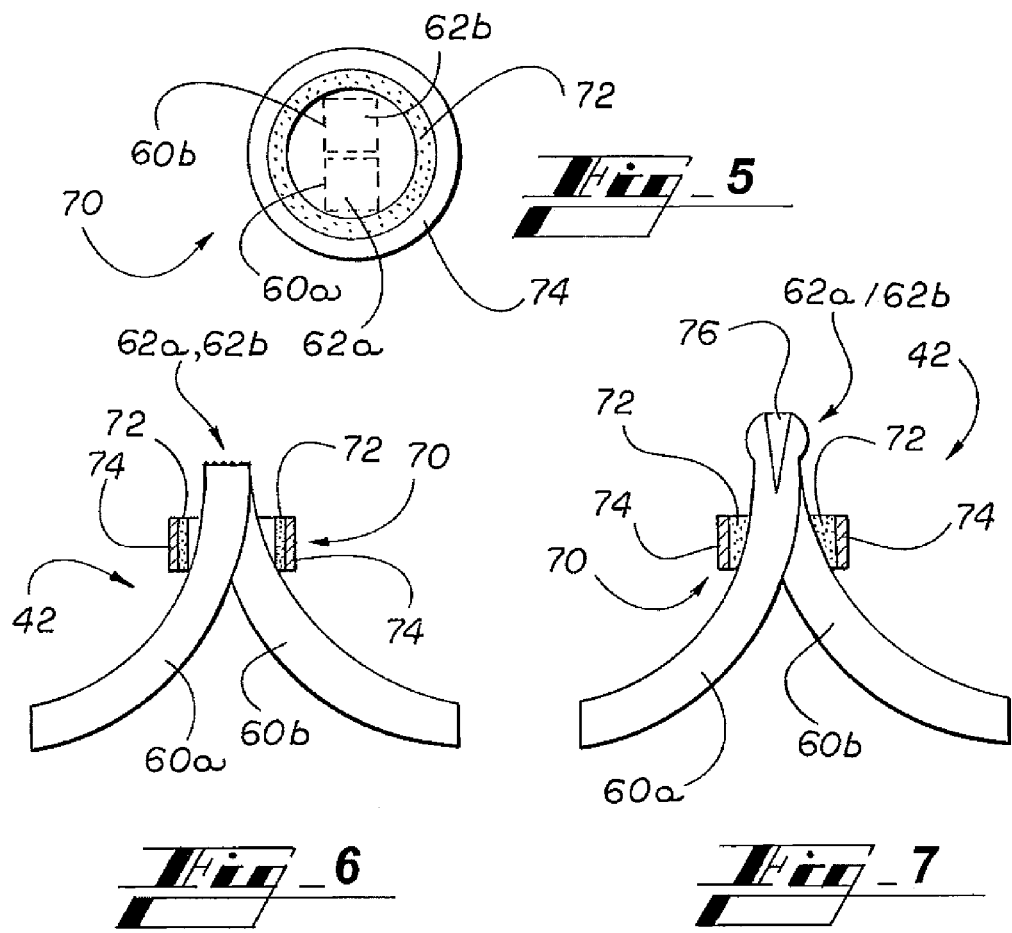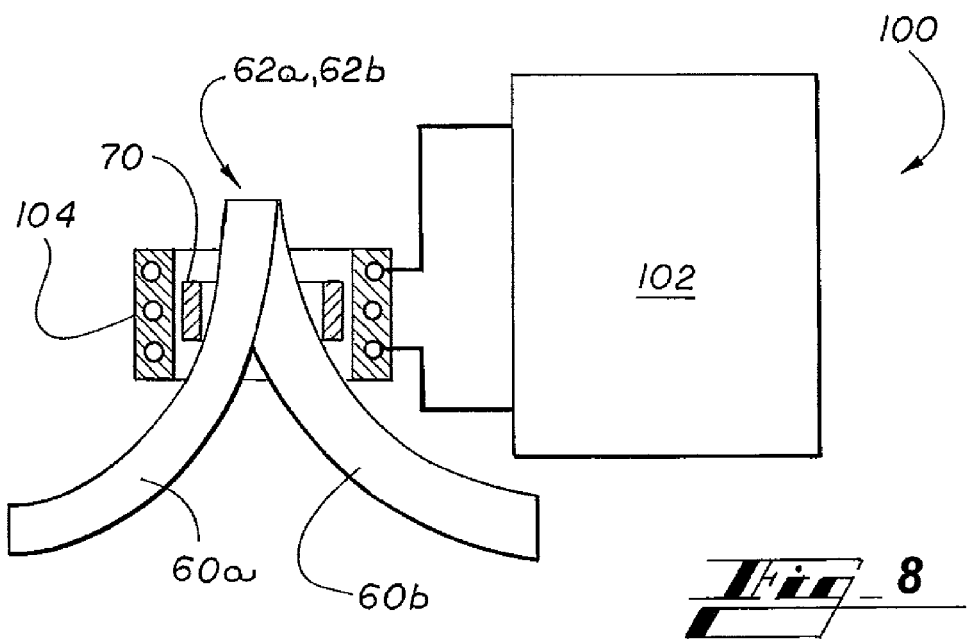

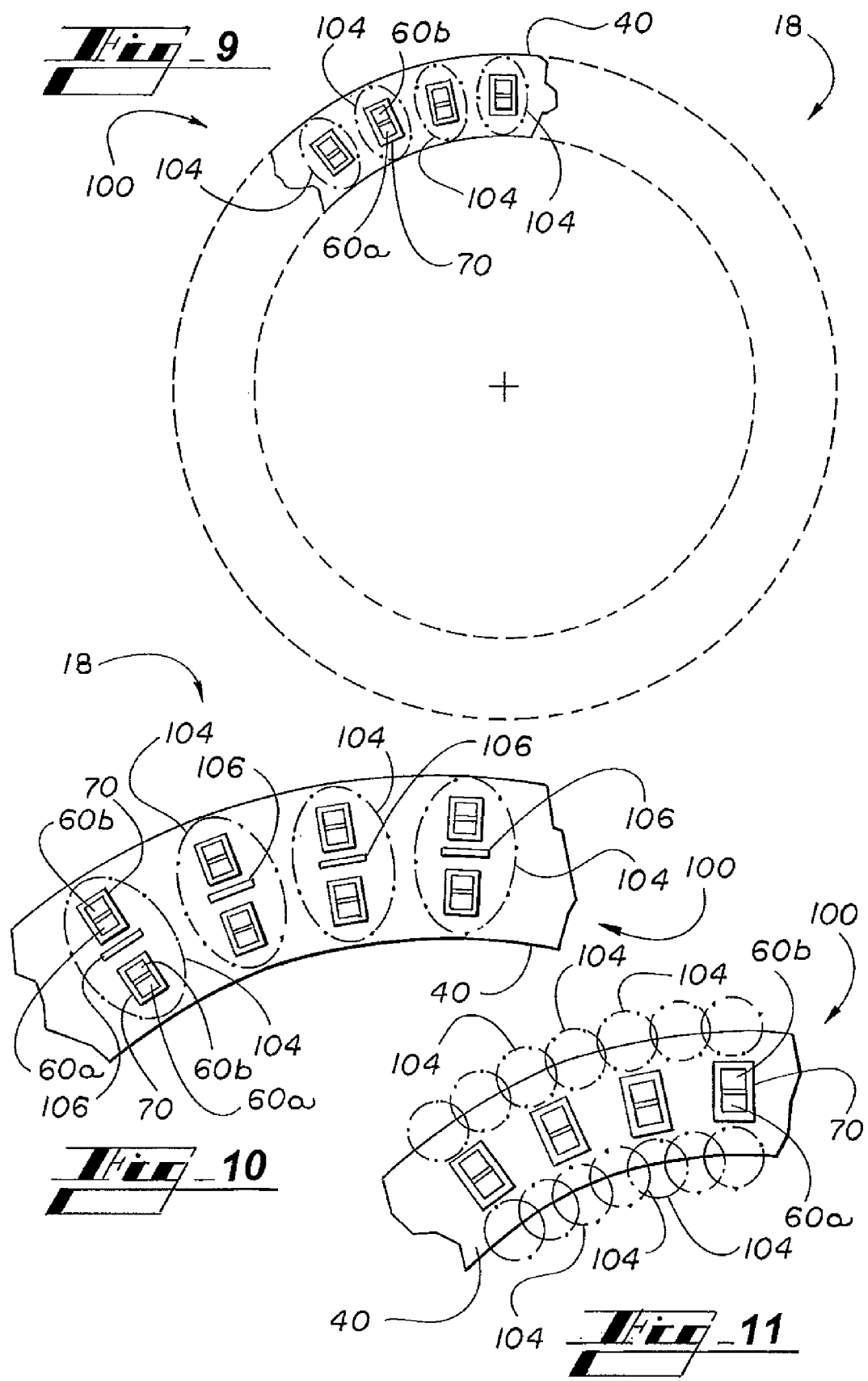

ELECTRIC MOTOR ASSEMBLIES AND SYSTEMS AND METHODS ASSOCIATED WITH JOINING WIRES OF ELECTRIC MOTOR ASSEMBLIES

TECHNICAL FIELD

The technical field is generally systems and methods associated with joining wires of electric motor assemblies.

BACKGROUND

In bar-wound electric motor assemblies, wires are typically welded together to assemble a stator. Quality welds are necessary because if one weld fails the motor fails. Because hundreds of welds may be required for a single motor, it is important that the welding process be highly robust and efficient so as to assure weld quality while minimizing the welding process time. Problems with current welding methods include the lack of quality welds due to misaligned wires and inefficient processes that have been introduced to align wires or increase the robustness of welds.

The free ends of wires typically require some alignment assistance in preparation for the welding process. For example, a robot end effecter (fingers) is used to hold a wire pair together. Two fingers are used to locate each pair of wires. A finger is inserted from each side of the pairs and then the two fingers are closed together to bring the two wires adjacent to each other in the perimeter direction. In addition, the fingers are designed to bring the two wires adjacent in the radial direction with the fingers holding the wires against each other. When the pair of wires is restrained in both directions by the fingers, the welding takes place and the fingers release the wires and retract out of the stator. Then, the stator indexes to the next slot to weld another pair of wires. This process is tedious and problems occur. For example, if the indexing and the wire bend do not lineup, the fingers hit the wires while being inserted into the stator.

In sum, without precisely aligning the pair of wires, the resulting weld could be defective. However, the robot end effector and other complex wire positioning tooling that has been introduced to align wire pairs prior to welding is expensive and complex. Therefore, there is a need for a joining method for reliably and reproducibly joining wires together.

SUMMARY

The various embodiments overcome the shortcomings of the prior art by providing electric motors having a robust stator and associated systems and methods for reliably, efficiently, and reproducibly joining wires of a stator to one another.

According to an exemplary embodiment, a stator for an electric motor includes a stator coil. The stator coil includes a wire pair with respective ends that are at least partially joined with a ring. The ring is positioned around the wire pair and joined to the wire pair by a metal joining process.

The foregoing has broadly outlined some of the aspects and features of the various embodiments, which should be construed to be merely illustrative of potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION OF THE DRAWINGS

FIG. 1 is a cross-sectional view of an electric motor assembly including a stator, according to an exemplary embodiment of the disclosure.

FIGS. 2 and 3 are partial elevational views of the stator of the electric motor assembly of FIG. 1 that are associated with an exemplary method of assembling the stator.

FIG. 4 is a partial perspective view of the stator of the electric motor assembly of FIG. 1 that is associated with an exemplary method of assembling the stator.

FIG. 5 is a plan view of a ring, according to an exemplary embodiment.

FIG. 6 is a partial schematic view of wires of the stator of FIGS. 2-4 and rings of FIGS. 5, 12, and 13.

FIG. 7 is a partial schematic view of the wires of FIG. 6 that are joined according to an exemplary method of assembling the stator.

FIG. 8 is a partial schematic view of the wires of FIG. 6 that are joined according to an exemplary method of assembling the stator and a schematic view of an associated system.

FIGS. 9-11 are a schematic illustrations of part of a stator and exemplary configurations of part of the system of FIG. 8.

FIGS. 12 and 13 are plan views of a ring, according to an exemplary embodiment.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are know to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

The embodiments are described herein with respect to the manufacture and assembly of bar-wound electric motors such as those that include automotive alternators. However, it is envisaged that the teachings of the disclosure are applicable to joining wires or bars in other manufacturing applications. Generally described, the systems and methods described herein increase the reliability of the connection between joined wires using a ring that connects wires or supports the connection between wires. Further, the ring reduces the complexity of the manufacturing process as the ring is easily placed over a wire pair to position and align the wire pair prior to welding the wire pair. One way in which the manufacturing process is simplified is that rings can be simultaneously placed over the wire pairs and wire pairs can then be simultaneously welded. Further, the ring enables the use of machine vision for welding as the boundary and center of the ring can be easily identified. Exemplary embodiments are now described in further detail.

As used herein, the term metal joining process refers to applying heat, pressure, magnetic force, lasers, electricity, friction, sound, or other energy sources in order to join metals.

A metal joining process can join metals that are in molten state or a solid state. Exemplary metal joining processes include welding, brazing, soldering, other processes involving coalescence, fusion bonding, combinations thereof, and the like. It should be understood that other metal joining processes can be substituted for the welding processes described herein.

Referring to FIG. 1, an exemplary electric motor 10 includes a rotor 12 that rotates around a shaft 14 within a case 16 and a stator 18 that is secured to the inner wall of the case 16. The stator 18 is configured to interface with the outer circumference of the rotor 12. The shaft 14 is rotatably supported in the case 16. A pulley 20 is secured to one end of the shaft 14 to enable rotational torque from an engine (not shown) to be transferred to the shaft 14 using a belt (not shown) and slip rings 22 are secured to the other end of the shaft 14 to supply electric current to the rotor 12. Brushes 24 are configured to slide in contact with the slip rings 22. The electric motor 10 also includes a regulator 26 that is configured to regulate the magnitude of an alternating voltage generated in the stator 18 and a rectifier 28 that is configured to convert an alternating current generated in the stator 18 to a direct current.

The rotor 12 includes a rotor coil 30 and a pair of pole cores 32a, 32b. The rotor coil 30 is configured to generate magnetic flux when electric current is passed through the rotor coil 30. Electric current is supplied from a battery (not shown) to the rotor coil 30 by the brushes 24 and the slip rings 22. The pole cores 32a and 32b are secured to the shaft 14 and intermesh adjacent the outside surface of the rotor coil 30. The pole core 32a is magnetized to "N" polarity by the magnetic flux of the rotor coil 30 and the pole core 32b is magnetized to "S" polarity by the magnetic flux of the rotor coil 30. The rotor 12 is rotated as rotational torque supplied by the engine (not shown) is transmitted to the shaft 14 by the belt (not shown) that is attached to the pulley 20. The rotating rotor 12 generates a changing magnetic flux.

The stator 18 includes a stator core 40 and a stator coil 42. The stator coil 42 includes wires 60, also referred to as bars, that are wound around the stator core 40 as described in further detail below. Alternating current is generated in the stator coil 42 by changing magnetic flux generated by the rotating rotor 12. The rotating magnetic field that is imparted to the stator coil 42 generates an electromotive force in the stator coil 42. This alternating electromotive force is converted to a direct current by the rectifier 28 and its voltage is regulated by the regulator 26.

Referring to FIGS. 2-8, assembly of the stator coil 42 is now described. The stator core 40 has a cylindrical shape and a plurality of slots 50 (see FIGS. 2 and 3) that extend in an axial direction and are disposed at an even angular pitch around the circumference of the stator core 40. The stator coil 42 is constructed by joining wire segments 60 (see FIG. 2) into one unit (see FIGS. 3 and 4). For example, wire segments 60 are heavy gage copper wires. Referring to FIG. 2, wire segments 60 are first configured to have a general U-shape and then the straight ends are inserted into respective slots 50. The ends of the wire segments 60 that extend outside the slots 50 are then bent, as shown by hidden lines in FIG. 2, such that ends 62 are positioned to be joined to ends 62 of other wire segments 60 in pairs, as shown in FIGS. 3 and 4. The ends of wire segments 60 are joined to complete a number of phases. For purposes of illustration, exemplary methods of joining the free ends 62a, 62b of a single pair of wire segments 60a, 60b are described in further detail below. Hereinafter, the pair of wire segments 60a, 60b is referred to as a wire pair 60a/60b. It should be understood that the described methods can be performed simultaneously to join all the wire pairs of the stator 18 at once.

Referring to FIGS. 2-7, a first method of positioning and joining the wire pair 60a/60b is now described. Referring to FIGS. 2-4, the free ends 62a, 62b are twisted, bent, pressed together, or otherwise positioned so as to be approximately aligned. Then, referring to FIGS. 3-6 and 12, a ring 70 is placed over the free ends 62a, 62b by a placement apparatus or fixture (not shown). The ring 70 is configured to constrain the position of the wire pair 60a/60b so that the wire segments 60a, 60b are precisely aligned and held in position during a welding process described in further detail below. As such, after placing the ring 70 over the wire pair 60a/60b, the placement apparatus can be removed before performing the welding process.

Referring momentarily to FIGS. 4, 5, and 12, the inner dimensions of the ring 70 are configured with respect to the size and shape of the combined cross-sections or perimeter of the wire pair 60a/60b. For example, the inner dimensions (e.g., diameter, cross section, and the like) of the ring 70 are configured to be large enough to provide adequate clearance for placement over the wire pair 60a/60b and are configured to be small enough to constrain and position the wire pair 60a/60b. The ring 70 holds the wire pair 60a/60b together in the proper relationship for welding without the need for a special gripping tool to further align or locate the wire pair 60a/60b. The ring 70 is placed over the wire pair 60a/60b at the same station (not shown) as the welding station (not shown) or in a prior staging location (not shown). Once the ring 70 is in place, as shown in FIGS. 3-6, the natural springback tension in the wire pair 60a/60b will hold the ring 70 in place until the subsequent welding operation. FIG. 5 illustrates a ring with a circular cross section and FIG. 12 illustrates a ring with a rectangular cross section. FIG. 4 illustrates each of the ring of FIG. 5 and the ring of FIG. 12, the ring of FIG. 5 being aligned to be placed on a wire pair and the ring of FIG. 12 being placed on a wire pair.

Continuing with FIGS. 5 and 12, the ring 70 is further configured to be tightly fit to the wire pair 60a/60b with a metal joining process and to prevent electrical shorts between the wire pair 60a/60b and adjacent wire pairs (see FIG. 3), which is particularly useful where the separation between adjacent wire pairs is small. The ring 70 includes a conductive inside layer 72 that is configured to tightly fit the ring 70 to the wire pair 60a/60b. For example, the inside layer 72 is a soldering or brazing material. The ring 70 further includes an insulating outside layer 74 that is configured to maintain the shape of the ring 70 and keep the inside layer 72 from contacting other wire pairs so as to cause an electrical short.

Referring to FIG. 7, after the ring 70 is placed over the wire pair 60a/60b (shown in FIG. 6), the ends 62a, 62b are joined with a fusion bonding or welding process (e.g., tungsten inert gas (TIG) welding, plasma welding, and the like) although other high temperature welding processes such as soldering or brazing can be used. The fusion bonding process metallurgically melts the ends 62a, 62b, which melt together and then solidify to form a joint 76 (schematically illustrated by a wedge). The joint 76 provides a strong, conductive connection.

Referring to FIGS. 12 and 13, in addition, heat or other energy from the fusion bonding process is transferred to the ring 70 such that the conductive inside layer 72 is heated, reaches a melting point, and flows around the wire pair 60a/60b. The melted inside layer 72 expands due to the heating and fills in gaps between the wire segments 60a, 60b and between the ring 70 and the wire pair 60a/60b. Upon cooling, the inside layer 72 shrinks back to a smaller size and solidifies around the wire pair 60a/60b. Shrinkage forces develop both in the ring 70 and the wire pair 60a/60b. The shrinkage forces in the wire pair 60a/60b cause the wire pair 60a/60b to flare up or move up and cause the wire pair 60a/60b and the ring 70 to tightly fit to one another. The ring 70 tightly fitting and applying a force to the wire pair 60a/60b in combination with the fusion of the ends 62a, 62b to form the joint 76 provide a reliable and secure connection between the wire segments 60a, 60b. Further, the ring 70 replaces complicated positioning tools. The welding process can remain substantially unchanged, yet the resulting connection is stronger as the ring 70 supports the joint 76.

As mentioned above, a ring placement apparatus (not shown) simultaneously places multiple rings over multiple wire pairs respectively. Likewise, a welding apparatus (not shown) simultaneously welds the wire pairs of the stator coil and, as a result, simultaneously bonds the rings to the wire pairs. Simultaneous welds can be performed because the use of rings provides that a special wire holding mechanism is not required to maintain alignment of ends during the welding process. The welding process can be optimized for throughput, cost, quality, and equipment reliability.

Referring to FIGS. 3-6 and 8, according to a second method of positioning and joining the wire pair 60a/60b, a magnetic pulse welding process is utilized to force the ring 70 around the wire pair 60a/60b. Magnetic pulse welding may be used to join similar and dissimilar metals. In this embodiment, the ring 70 is made of material with high conductivity so as to be well-suited for generating high magnetic forces and has a thin cross-section so as to be well-suited for collapsing around the wire pair 60a/60b. The ring 70 is placed onto the wire pair 60a/60b as described above with respect to FIGS. 3-6. However, according to this method, the ring 70 and the wire pair 60a/60b are joined by a magnetic pulse welding process illustrated in FIG. 8 instead of the fusion bonding process described above with respect to FIG. 7.

Referring to FIG. 8, a magnetic pulse system 100 includes a magnetic pulse generator 102 and a magnetic coil 104 that is configured to generate a magnetic field. The magnetic coil 104 is configured to be positioned adjacent to the ring 70 and the wire pair 60a/60b. A primary magnetic field is generated as the generator 102 directs a very high alternating current (AC) through the magnetic coil 104. The magnetic field generates a secondary eddy current in the ring 70 according to Lenz's Law and the secondary eddy current in turn generates a secondary magnetic field. The primary magnetic field and the secondary magnetic field oppose each other. The opposed magnetic fields produce a repelling force, known as a Lorentz force, between the magnetic coil 104 and the ring 70. The Lorentz force forces the ring 70 against the wire pair 60a/60b such that a solid state weld occurs between the ring 70 and the wire pair 60a/60b or otherwise the ring 70 collapses over or tightly wraps around the wire pair 60a/60b.

Exemplary configurations of magnetic pulse systems 100 with a plurality of magnetic coils 104 are now described. The exemplary magnetic pulse systems 100 are configured to simultaneously weld a number of rings to a number of wire pairs using the magnetic pulse welding process described with respect to FIG. 8. FIGS. 9 and 11 illustrate magnetic pulse systems 100 that are configured for a single row of wire pairs and FIG. 10 illustrates a magnetic pulse system 100 that is configured for two rows of wire pairs. Alternative configurations for three or more rows can be developed based on the teachings provided herein. Referring to FIG. 9, a first magnetic pulse system 100 includes magnetic coil 104 that are each configured to surround a respective single wire pair 60a/60b. A similar configuration is used for welding more than one row of wire pairs where the wire pairs are staggered radially around the stator. The magnetic pulse system 100 of FIG. 9 is configured to avoid interference between the magnetic coil 104 and adjacent wire pairs 60.

Referring to FIG. 10, the magnetic pulse system 100 includes magnetic coil 104 that surround two radially aligned wire pairs 60a/60b. Here, a solid spacer 106 is positioned between the two wire pairs 60a/60b to prevent contact between successive rows of wire pairs 60. As such, the magnetic pulse system 100 is configured to simultaneously weld two rows of wire pairs.

Referring to FIG. 11, the magnetic pulse system 100 includes magnetic coil 104 that are configured to be positioned around the inner and outer circumference of the welded end of the stator on each side of a row of wire pairs.

The magnetic pulse welding process can be used on its own or along with traditional welding processes used for wire pairs such as tungsten-arc welding, TIG welding, brazing, soldering. Using the magnetic pulse welding process on its own, the ring is the primary functional component for holding the wire pairs together. When combined with traditional welding processes, the ends of wire pairs can be additionally joined as described above.

The above-described embodiments are merely illustrative implementations that are set forth for a clear understanding of principles. Variations, modifications, and combinations of the above-described embodiments may be made without departing from the scope of the claims. All such variations, modifications, and combinations are included herein by the scope of this disclosure and the following claims.

What is claimed is:

1. A stator, for an electric motor, comprising:
  a stator coil, comprising:
    a wire pair consisting of two adjacent wires having respective ends joined together by a heat-applying process to form a joint; and
    a ring positioned around the two wires, constituting the wire pair, and offset by a pre-determined distance from the respective ends of the two wires forming the wire pair, yielding an offset distance separating the ring and the ends of the two wires;
  wherein:
    the ring comprises a conductive inside layer and an insulating outside layer; and
    the conductive inside layer applies shrinkage forces to the two wires constituting the wire pair.

2. The stator of claim 1, wherein the ring is configured to align the two wires constituting the wire pair to be joined together to form the joint.

3. The stator of claim 1, wherein the conductive inside layer is configured to melt in response to heat and expand to fill a gap between the ring and the two wires constituting the wire pair.

4. The stator of claim 1, wherein the shrinkage forces result from the conductive inside layer melting, in response to heat, and expanding to fill in a gap between the ring and the two wires constituting the wire pair, and then cooling and shrinking around the two wires.

5. The stator of claim 4, wherein the insulating outside layer is configured to maintain a shape of the ring when the inside layer is melted.

6. The stator of claim 1, wherein the conductive inside layer is a soldering or brazing material.

7. A method, for assembling a stator coil, comprising:
  positioning a ring, comprising a conductive material, around a wire pair of the stator coil, the wire pair consisting of two adjacent wires, so that the ring is offset from respective ends of the two wires constituting the wire pair, yielding an offset distance separating the ring and the respective ends of the two wires constituting the wire pair;

applying heat to the respective ends of the two wires constituting the wire pair to form a joint, wherein the heat is transferred along a length of the two wires constituting the wire pair to the ring and melts the conductive material, wherein the conductive material expands in response to the heat and fills in a gap between the ring and the two wires of the wire pair; and allowing the melted conductive material to solidify to join the ring to the two wires constituting the wire pair, wherein the conductive material shrinks as it solidifies.

8. The method of claim 7, wherein applying heat includes applying a fusion bonding or welding process.

9. The method of claim 7, wherein positioning the ring comprises sliding the ring over the respective ends of the two wires constituting the wire pair.

10. The method of claim 7, wherein the shrinking of the conductive material applies shrinking forces to the two wires constituting the wire pair.

11. The method of claim 7, the ring comprising:
an insulating outside layer; and
a conductive inside layer comprising the conductive material, wherein the conductive material expands within the insulating outside layer in response to the heat and the insulating outside layer is configured to maintain a shape of the ring when the conductive material is melted.

12. The method of claim 7, wherein the conductive material is a soldering or brazing material.

13. A stator coil formed by a process comprising:
positioning a ring, comprising a conductive material, around a wire pair of the stator coil, the wire pair consisting of two adjacent wires, so that the ring is offset from respective ends of the two wires constituting the wire pair, yielding an offset distance separating the ring and the respective ends of the two wires constituting the wire pair;
applying heat to the respective ends of the two wires constituting the wire pair to form a joint, wherein the heat is transferred along a length of the two wires constituting the wire pair to the ring and melts the conductive material, wherein the conductive material expands in response to the heat and fills in a gap between the ring and the two wires of the wire pair; and
allowing the melted conductive material to solidify to join the ring to the two wires constituting the wire pair, wherein the conductive material shrinks as it solidifies.

14. The stator coil of claim 13, wherein applying heat includes applying a fusion bonding or welding process.

15. The stator coil of claim 13, wherein positioning the ring comprises sliding the ring over the respective ends of the two wires constituting the wire pair.

16. The stator coil of claim 13, wherein the shrinking of the conductive material applies shrinking forces to the two wires constituting the wire pair.

17. The stator coil of claim 13, the ring comprising:
an insulating outside layer; and
a conductive inside layer comprising the conductive material, wherein the conductive material expands within the insulating outside layer in response to the heat and the insulating outside layer is configured to maintain a shape of the ring when the conductive inside layer is melted.

18. The stator coil of claim 13, wherein the conductive material is a soldering or brazing material.

19. A stator coil comprising:
a wire pair consisting of two adjacent wires having respective ends joined together by a heat-applying process to form a joint; and
a ring positioned around the two wires, constituting the wire pair, and offset by a pre-determined distance from the respective ends of the two wires forming the wire pair, yielding an offset distance separating the ring and the ends of the two wires;
wherein:
the ring comprises a conductive inside layer and an insulating outside layer; and
the conductive inside layer applies shrinkage forces to the two wires constituting the wire pair.

* * * * *